H. W. KOEHLER.
CHUCK APPARATUS.
APPLICATION FILED JUNE 17, 1920.

1,414,190.

Patented Apr. 25, 1922.

INVENTOR.
Hillard W. Koehler
BY A. B. Bowman
ATTORNEY

UNITED STATES PATENT OFFICE.

HILLARD W. KOEHLER, OF CORONADO, CALIFORNIA.

CHUCK APPARATUS.

1,414,190.  Specification of Letters Patent.  Patented Apr. 25, 1922.

Application filed June 17, 1920. Serial No. 389,741.

*To all whom it may concern:*

Be it known that I, HILLARD W. KOEHLER, a citizen of the United States, residing at Coronado, in the county of San Diego and State of California, have invented certain new and useful Chuck Apparatus, of which the following is a specification.

My invention relates to piston groove and ring chucks more particularly to be used for supporting pistons and concentric rings while they are being re-turned or ground to a perfect circle after being roughed out and gapped and the objects of my invention are: first, to provide a combination chuck for supporting both the piston to re-finish the ring grooves and the rings for turning or re-grinding to a perfect circle after being gapped; second, to provide a novel device for supporting a piston for re-finishing the ring grooves; third, to provide a novel device for positioning and supporting concentric rings for grinding or re-finishing after being gapped; fourth, to provide a device of this class, a portion of which is applicable for both uses; fifth, to provide a device of this class which is applicable for use for supporting different diameter pistons and piston rings and sixth, to provide a device of this class which is very simple and economical of construction and operation, positive and accurate and which will not readily deteriorate or get out of order.

Figure 1:
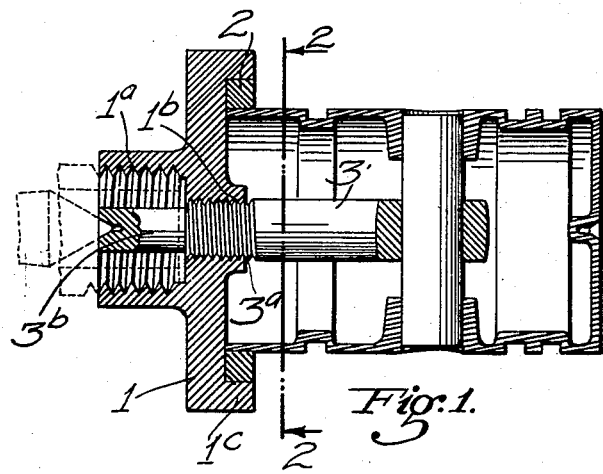
Figure 2:
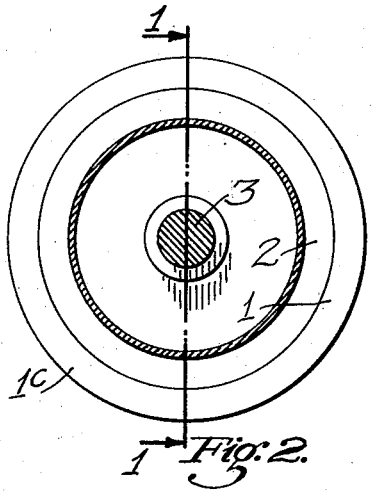
Figure 3:
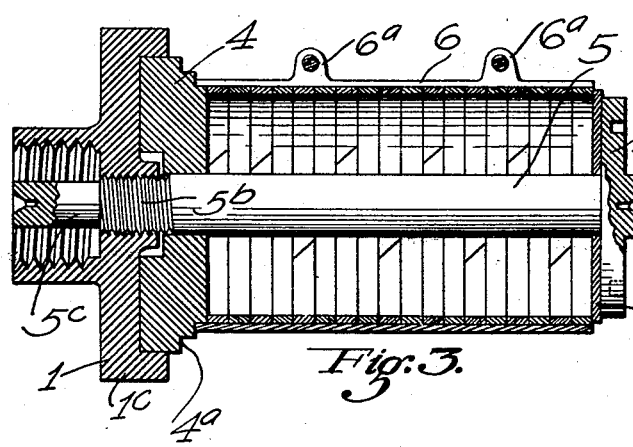
Figure 4:
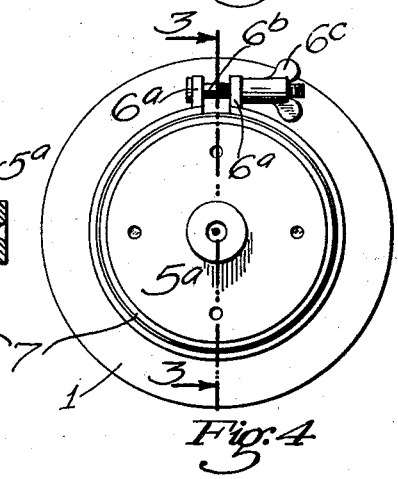
Figure 5:
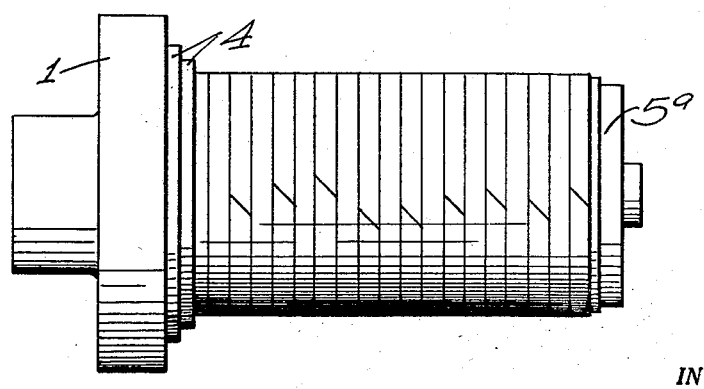

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which from a part of this application in which:

Figure 1 is a longitudinal sectional view through 1—1 of Fig. 2 of the chuck shown positioned on the lathe centers which are shown by dotted lines and showing a piston in position thereon ready for re-finishing the ring grooves; Fig. 2 is a sectional view through 2—2 of Fig. 1; Fig. 3 is a longitudinal sectional view through 3—3 of Fig. 4 showing the chuck with the additional parts in connection therewith shown supporting a plurality of concentric piston rings ready for re-finishing or re-grinding to a perfect circle after they have been gapped and before the clamp has been removed; Fig. 4 is an end view thereof and Fig. 5 is a side elevational view of the device with the piston rings clamped in position ready for re-finishing and with the clamp removed.

Similar characters of reference refer to similar parts and portions throughout the several views of the drawings.

The chuck head 1, pilot ring 2, piston support 3, pilot plate 4, ring support 5, clamping member 6 and washer 7 constitute the principal parts and portions of my chuck.

The chuck head 1 is an annular member provided with an extended portion $1^a$ which is threaded internally adapted to screw on the lathe or other tool spindle and is also provided with a smaller hole $1^b$ which is also threaded, adapted for the thread $3^a$ on the piston support 3. This piston support 3 is also provided with a reduced extended portion $3^b$ which is provided with a center adapted for the lathe center, it being here noted that the chuck head 1 may be supported either on a spindle or center of the lathe or tool. This support 3 is provided with a hole therein adapted to fit the wrist pin of the piston so that when the wrist pin is positioned in the support 3, as shown in Fig. 1 of the drawings, the piston may be turned relatively to the head 1 until the piston is secured rigidly against the face of this head 1. This head 1 is provided with an annular extended flange $1^c$ which is provided with an inner diameter of the size of the larger piston and when it is desired to re-finish smaller pistons the pilot ring 2 is used which is of varying thickness for the varying sized diameter pistons. When it is desired to use the chuck for re-finishing the piston rings the pilot plate 4 is used which is provided with a multiple diameter surface $4^a$ on one side and its other side adapted to rest against the face of the chuck head 1 inside of the flanges $1^c$. The piston support 3 is removed from the chuck head and the ring support 5 which is provided with a head plate $5^a$ and with threads $5^b$ which conform to the threads $3^a$ on the support 3 and are therefore adapted to fit in the hole $1^b$ in the chuck head 1. It is also provided with a reduced extended portion $5^c$ which is provided with a center adapted for the lathe or other tool center. There is also provided a clamping sleeve 6 which is a cylindrical member open at each end and gapped along one side provided with lugs $6^a$ adapted for bolts $6^b$ upon which are mounted wing nuts $6^c$, thus forming a clamp for the piston rings. The piston rings after being properly gapped are positioned side by side in this clamp member 6 which is of the proper size to hold them closed as shown best in Fig. 3 of the drawings and the clamp positioned with one end over one of the multiple diameter portions of the face 4ᵃ conforming to the size of the piston ring, then the member 5 is screwed into the head until the washer 7, which rests against the head 5ᵃ, rests against the rings positioning them together, then the member 5 is turned until the rings are securely clamped between the washer 7 and the face of the pilot plate 4, after which the wing nuts 6ᶜ are loosened and the clamp member 6 removed endwise and the outer surface of the rings are then ready to be turned or ground to a perfect circle, after which they may be readily released by releasing the member 5.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction, there is provided a combination chuck which may be used with the changing of some of the parts for turning and re-finishing the grooves in the piston of varying sizes or for re-finishing the piston rings of varying diameter pistons; that the parts for the different sizes are interchangeable and that the one device with the accessories used therewith permits the finishing and fitting of pistons and piston rings of varying sizes, after the rings have been roughed and gapped and providing accurate fitting pistons and piston rings.

Having thus described my invention what I claim as new and desire to secure by Letters Patent is:

1. A chuck apparatus, including a chuck head provided with a large internally threaded hole and with a reduced internally threaded hole extending outwardly therefrom and with an extended annular flange, an intermediate annular member adapted to fit in said flange and against the face of said chuck head and a supporting member provided with external threads and one end adapted to screw into the smaller threads in said chuck head.

2. A chuck apparatus, including a chuck head provided with a large internally threaded hole and with a reduced internally threaded hole extending outwardly therefrom and with an extended annular flange, an intermediate annular member adapted to fit in said flange and against the face of said chuck head and a supporting member provided with external threads and one end adapted to screw into the smaller threads in said chuck head, said supporting member provided with a center hole in its opposite ends.

3. A chuck apparatus, including a chuck head provided with a large internally threaded hole and with a reduced internally threaded hole extending outwardly therefrom and with an extended annular flange, an intermediate annular member adapted to fit in said flange and against the face of said chuck head and a supporting member provided with external threads and one end adapted to screw into the smaller threads in said chuck head, and a cylindrical clamp adapted to be positioned around said support and engage said intermediate annular member at one of its ends.

4. A chuck apparatus, including a chuck head provided with a large internally threaded hole and with a reduced internally threaded hole extending outwardly therefrom and with an extended annular flange, an intermediate annular member adapted to fit in said flange and against the face of said chuck head and a supporting member provided with external threads and one end adapted to screw into the smaller threads in said chuck head, said supporting member provided with a center hole in its opposite ends, and a cylindrical clamp adapted to be positioned around said support and engage said intermediate annular member at one of its ends.

5. A chuck apparatus, including a chuck head provided with a large internally threaded hole therein, and with a smaller threaded hole extending therefrom and with an extended annular flange and provided with a flat space from said flange to near the center thereof, an intermediate annular member in said flat space of said chuck head, a supporting member provided with a flange on one end and external threads on its other end adapted to fit the threads in the smaller hole in the said chuck head and extending through said intermediate member and provided with center hole at each end of said supporting member and a cylindrical clamping member adapted to fit over said supporting member between said flange and said intermediate member, adapted to support the piston rings while the support is being adjusted.

In testimony whereof, I have hereunto set my hand at San Diego California this 11th day of June 1920.

HILLARD W. KOEHLER.